(12) United States Patent
Lanni

(10) Patent No.: US 12,001,003 B2
(45) Date of Patent: Jun. 4, 2024

(54) IMMERSION FRONT-END LENS SYSTEM

(71) Applicant: CARNEGIE MELLON UNIVERSITY, Pittsburgh, PA (US)

(72) Inventor: Frederick Lanni, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 711 days.

(21) Appl. No.: 17/050,952

(22) PCT Filed: Jun. 26, 2019

(86) PCT No.: PCT/US2019/039285
§ 371 (c)(1),
(2) Date: Oct. 27, 2020

(87) PCT Pub. No.: WO2020/006101
PCT Pub. Date: Jan. 2, 2020

(65) Prior Publication Data
US 2021/0231940 A1 Jul. 29, 2021

Related U.S. Application Data

(60) Provisional application No. 62/763,694, filed on Jun. 27, 2018.

(51) Int. Cl.
*G02B 21/02* (2006.01)
*G02B 21/33* (2006.01)
(52) U.S. Cl.
CPC ........... *G02B 21/33* (2013.01); *G02B 21/025* (2013.01)

(58) Field of Classification Search
CPC ...... G02B 21/33; G02B 21/025; G02B 21/02; G02B 21/0004
See application file for complete search history.

(56) References Cited

U.S. PATENT DOCUMENTS

| 4,104,650 A | * | 8/1978 | Hosoe ...................... G02B 7/36 396/296 |
| 6,215,586 B1 | | 4/2001 | Clark |
| 6,858,843 B1 | | 2/2005 | Mankos et al. |

(Continued)

OTHER PUBLICATIONS

International Search Report and Written Opinion for International Patent Application No. PCT/US2019/039285 dated Oct. 2, 2019, 8 pages.

(Continued)

*Primary Examiner* — Mustak Choudhury
(74) *Attorney, Agent, or Firm* — KDW FIRM PLLC

(57) ABSTRACT

An accessory optic is described which enables a non-immersed, long working distance microscope objective to be used as a higher-power immersion objective. This is particularly useful for biological imaging of specimens in an index-matching clarification medium. The accessory approach is the opposite of conventional unitized immersion objective design and presents several advantages over conventional design. The front lens element of the accessory may be selected to have precisely the refractive index of the specimen immersion medium and the accessory may be designed for use with immersion media that are incompatible with conventional immersion objectives. A dual accessory enables two such modified objectives to be optimized for light-sheet microscopy.

13 Claims, 10 Drawing Sheets

(56) References Cited

U.S. PATENT DOCUMENTS

| | | | |
|---|---|---|---|
| 7,046,450 B2 | 5/2006 | Hirata | |
| 7,199,938 B2 | 4/2007 | Fujimoto | |
| 7,215,478 B1* | 5/2007 | Hirata | G02B 21/33 |
| | | | 359/769 |
| 7,324,274 B2 | 1/2008 | Komatsu et al. | |
| 7,619,829 B2 | 11/2009 | Okazaki et al. | |
| 7,642,297 B2 | 1/2010 | Verstegen et al. | |
| 7,808,880 B2 | 10/2010 | Bell, Jr. et al. | |
| 7,852,552 B2 | 12/2010 | Harada et al. | |
| 7,935,213 B2 | 5/2011 | Verstegen et al. | |
| 8,199,407 B2 | 6/2012 | Liebel et al. | |
| 8,456,770 B2 | 6/2013 | Kimura et al. | |
| 8,465,708 B2 | 6/2013 | Harada et al. | |
| 8,465,709 B2 | 6/2013 | Harada et al. | |
| 8,724,227 B2 | 5/2014 | Wartmann | |
| 9,488,817 B2 | 11/2016 | Shi et al. | |
| 9,488,818 B2 | 11/2016 | Bauer et al. | |
| 9,645,380 B2 | 5/2017 | Wartmann | |
| 2004/0231220 A1* | 11/2004 | McCormick | F41G 3/06 |
| | | | 42/120 |
| 2005/0094293 A1* | 5/2005 | Tanabe | G02B 7/14 |
| | | | 359/811 |
| 2005/0200947 A1* | 9/2005 | Hirata | G02B 21/0004 |
| | | | 359/368 |
| 2008/0279542 A1 | 11/2008 | Frazier | |
| 2009/0002815 A1* | 1/2009 | Hoult | G01N 21/552 |
| | | | 359/391 |
| 2011/0115895 A1 | 5/2011 | Huisken | |
| 2014/0247502 A1* | 9/2014 | Bauer | G02B 21/33 |
| | | | 359/656 |
| 2016/0187633 A1 | 6/2016 | Rondeau | |
| 2017/0168292 A1 | 6/2017 | Koenig et al. | |
| 2017/0363864 A1 | 12/2017 | Margolis | |

OTHER PUBLICATIONS

Glaser et al., "Multi-immersion Open-Top Light-Sheet Microscope for High-1 Throughput Imaging of Cleared Tissues", bioRxiv [online], Posted online on Feb. 13, 2019, Retrieved from URL:<https://www.biorxiv.org/content/10.1101/548107v1>, Retrieved on Oct. 28, 2020, 22 pages.

Wang, "High Resolution Structured Illumination Solid Immersion Fluorescence Microscopy", Thesis Submitted to the University of Nottingham for the Degree of Doctor of Philosophy, Apr. 2010, 262 pages.

Zeiss, "Universal Rotary Stage Objectives, Condenser", Zeiss Polarization Catalog, p. 46, 1983.

Zhang et al., Imaging Performance of Widefield Solid Immersion Lens Microscopy, Applied Optics, vol. 46, No. 20, Jul. 10, 2007, 7 pages.

* cited by examiner (A)

(B)

(A)

(B)

(C)

(A)

(B)

IMMERSION FRONT-END LENS SYSTEM

RELATED APPLICATIONS

This application claims benefit of U.S. Provisional Patent Application No. 62/763,694, filed Jun. 27, 2018 entitled "Drop-In Immersion Front-End Lens System for Long Working-Distance Microscope", the contents of which are incorporated herein in their entirety.

BACKGROUND OF THE INVENTION

Optical deep imaging in biological specimens (e.g. tissues, organs, embryos, biofilms, cell masses, artificial organs) is resurgent in a number of areas of biomedical science. In general, this practice requires the use of a microscope objective that is designed for immersion either in a culture medium (generally for living specimens) or in a clarifying medium (generally for preserved specimens).

For living specimens, water-immersion or silicone oil immersion objectives are optimal. For fixed (preserved) specimens, the highest optical transparency usually is obtained with specially formulated infiltration liquids. Dramatic advances, such as the Scale and CLARITY methods, have rendered centimeter-size objects such as whole embryos or the intact brain of a mouse sufficiently transparent for direct microscopic imaging without the need for cutting the tissue into sections. This places extraordinary demands on the immersion requirements and working distances of microscope objectives for deep imaging and has driven the design of special objectives with 3-8 mm working distance corrected for the refractive index of ScaleA2 medium (n=1.387), CLARITY medium (n=1.453), or conventional oil immersion (n=1.518). These specialty objectives tend to be costly and most cannot be used with solvents or immersion media differing from the design formulations.

SUMMARY OF THE INVENTION

Described herein is an accessory optic comprising a lens or lens assembly, for a low-power, non-immersed, long working distance microscope objective that transforms it into a higher-power immersion objective useful for deep imaging of specimens infiltrated with a clarifying medium or solvent. The accessory optic is easily attachable to the main objective. The "add-on" design of the optic confers several advantages over traditional unitized immersion objectives. The accessory optic increases the resolution and magnification of the objective while retaining sufficient working distance for millimeter-depth imaging. Of equal importance, the accessory optic enables use of index-matching solvents that otherwise are incompatible with standard immersion objectives, including cases in which a cover glass cannot be used to separate the mounting medium of the specimen from the immersion medium of the lens.

The accessory optic may be embodied in the form of low-cost "kits". It is contemplated that two kits would be provided, but other types of kits may also be useful. The two kits include a Type I kit for deep imaging by conventional or confocal microscopy, and a Type II kit for deep imaging by 'light-sheet' microscopy, also known as selective-plane illumination microscopy (SPIM). The Type I kit comprises the accessory optic assembly with the front lens element selected to match, as closely as possible, the refractive index of the intended immersion medium. The Type I kits may comprise multiple accessory optics for use with different immersion media. The front optical element, which is a simple plano-convex lens, can be produced easily for this purpose from a range of optical glasses. The Type II kit comprises the accessory optics for a pair of objectives, but with a specially-configured pair of plano-convex lenses for optimal positioning of the two objectives for SPIM and optimal viewing of large specimens.

DETAILED DESCRIPTION OF THE INVENTION

Figure 1:
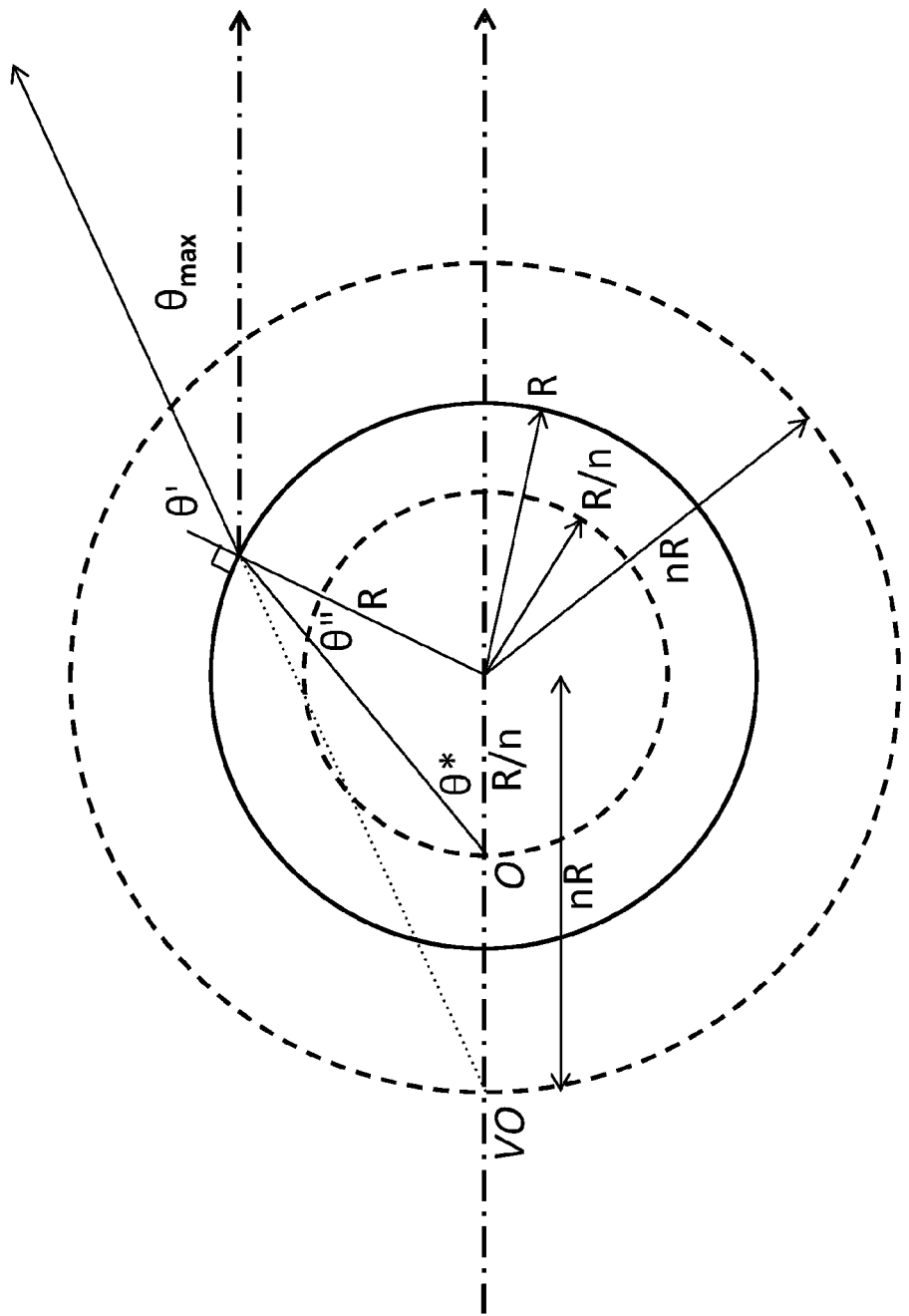
FIG. 1 shows aplanatic refraction by a sphere.

Described herein is an accessory optic for a microscope objective and the use of the accessory optic in a microscope objective system for deep imaging of specimens immersed in refractive-index matching media. The use of the accessory optic with a low-power, non-immersed, long working distance microscope objective results in a moderate-power, moderate magnification, liquid-immersion objective system with sufficient working distance for use in deep imaging including selective plane illumination microscopy (SPIM).

The invention comprises at least two optics kits for microscopes. A Type I kit comprises an accessory immersion lens assembly which may be inserted between a non-immersed microscope objective and the specimen. A Type II kit comprises an optical setup for deep imaging by light sheet microscopy (also known as selective-plane illumination microscopy or SPIM) and incorporates a modification of the optics described in the Type I kit as the central optical component.

Type I Kit

The accessory device is referred to as an attachable immersion front end because it consists of a singlet lens, or a more complex lens assembly comprising a singlet lens and one or more secondary optics, that is inserted between a microscope objective and a specimen, and which is coupled to the specimen by an immersion medium. The immersion medium may be the same medium in which the specimen is immersed or may be an iso-refractive immersion oil separated from the immersed specimen by a window or coverglass. In the ideal case, the refractive index of the immersion medium and the refractive index of the front lens element are equal. For practical reasons, the indices may be chosen to differ. In the simplest case, the accessory optic is a single plano-convex lens which may be a hemisphere or hyperhemisphere.

This invention is related to the conventional design of high-power oil-immersion objectives in which a hyperhemisphere and meniscus lens duplex constitute the built-in front end of the objective. In a conventional high-power oil-immersion objective, the front lens element is aplanatic. This is referred to as an Amici-type front end. Because of the unitized construction of conventional objectives, most only can be used with specific immersion media.

Additionally, in all conventional oil-immersion objectives the working distance generally is small, typically 60-500 µm, which limits their use in deep imaging. Recently, immersion objectives with moderate numerical aperture (NA) and 1-10 mm working distances have been introduced for large-scale (millimeter or centimeter) specimens rendered transparent with Scale, CLARITY, or other media. Some of these lenses are compatible with oil immersion but are generally not compatible with high-index organic liquids such as methyl salicylate.

The Amici-type front end of the present invention is a separate accessory optic that can be matched to any immersion medium by selection of the optical glass for manufacture. In practice, a standard glass is selected, and the refractive index of the immersion medium is adjusted slightly to match. When attachably connected to a long working-distance low-power objective, immersed working distances much greater than 1 mm can be attained. In its simplest form, the attachable front end consists of a centered plano-convex lens inserted between the specimen and the microscope objective with the curved surface of the lens facing the microscope objective and the flat surface of the lens coupled to the specimen by the immersion medium. Because the immersion medium and the lens have the same refractive index, the curved surface of the lens is the only additional refracting surface in the optical system. The plano-convex (PCX) lens may be a conventional thin lens, a thick lens, a hemisphere, or an Amici-type hyper-hemisphere. Without loss of generality, we refer to the drop-in lens as a hemisphere of radius $R_S$. Because of the index-matching fluid, the immersed surface of the lens may have arbitrary curvature. As such, the term "plano surface" as used herein should be interpreted as referring to a flat or arbitrarily curved surface.

Aplanatic refraction occurs at a spherical glass surface. In this circumstance, a spherical wavefront passing through the surface is transformed by refraction into a precisely spherical wavefront with altered radius of curvature. In other words, the refraction introduces no spherical aberration, even for rays far outside the paraxial zone of the optical system. For a glass sphere of radius $R_S$ and index of refraction $n_g$, aplanatic refraction occurs when a point source of spherical waves is positioned within the glass at a radius from the center equal to $R_S/n_g$. Rays exiting the opposite side of the sphere are refracted to form a spherical wave that is exactly centered on a back-projected collinear point outside the sphere at a radius equal to $n_g R_S$.

FIG. 1 shows the aplanatic effect. For a glass sphere, the internal aplanatic surface is a centered spherical shell of radius $R_S/n_g$, and the external aplanatic surface is a centered spherical shell of radius $n_g R_S$. A point source located on the internal aplanatic surface is imaged as a virtual point source located at the collinear point on the external aplanatic surface. This occurs for all rays, independent of the ray angle θ*, up to θ*, 90 degrees.

In the example shown in FIG. 1, a point source at O located at a distance $R_{int}=R_S/n_g$ from the center emits spherical waves. One ray is shown making an angle θ* with the axis and making an angle $θ_{max}$ after refraction at the spherical surface. The back-projection of the refracted ray intersects the axis at VO, the collinear point at a distance $R_{ext}=n_g R_S$ from the center. This is an exact result for any ray that exits the far side of the sphere. Therefore, VO is a perfect virtual object and the refracted wavefront exactly spherical and centered at this point.

Figure 2:
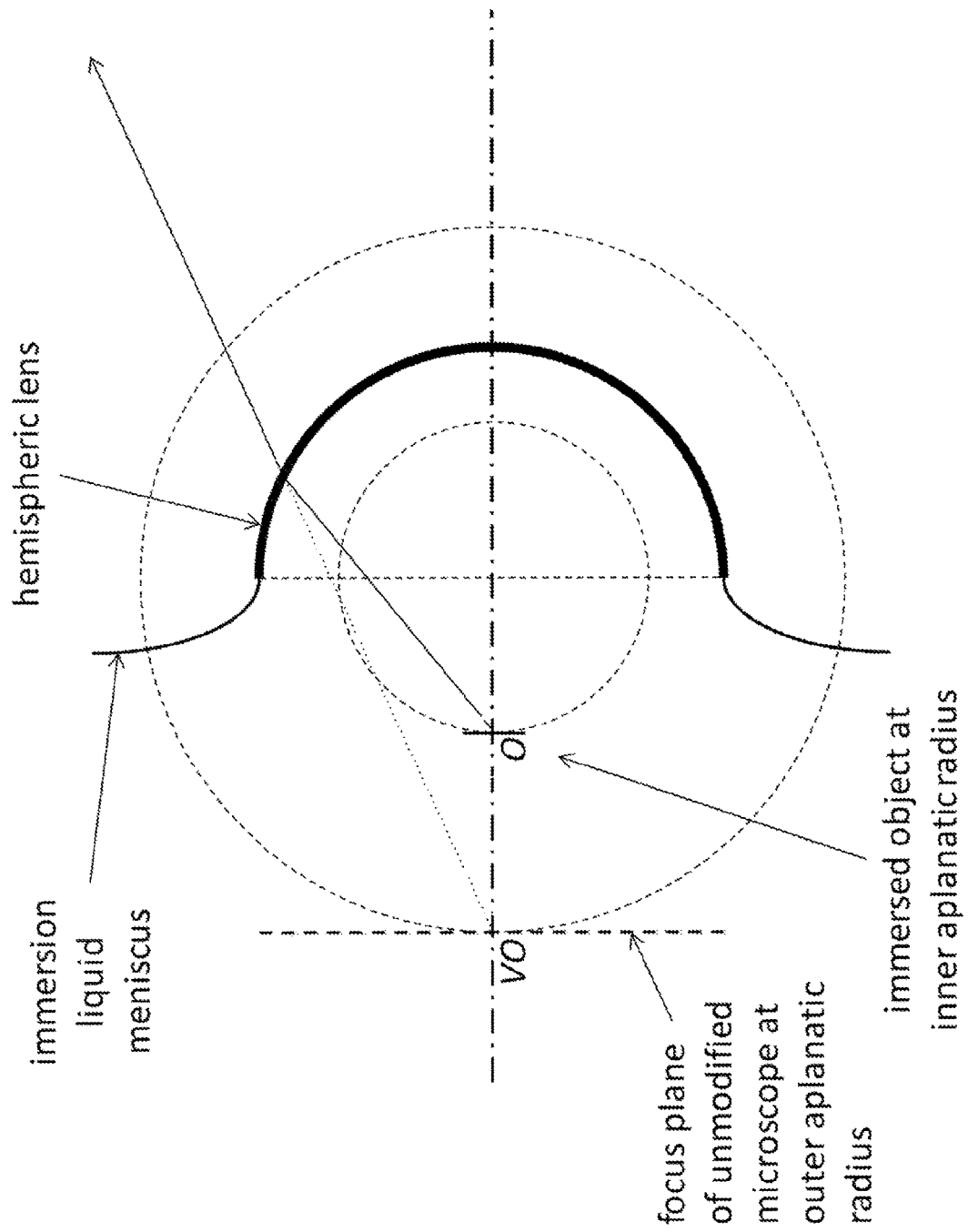
FIG. 2 shows the aplanatic condition implemented with immersion optics. The lens is shown as hemispheric, but may be any plano-convex lens, or generally, any singlet lens with a spherical outer surface.

Because $n_g>1$ in all cases, $n_g R_S > R_S > R_S/n_g$. This applies equally to all plano-convex (PCX) lenses when immersed in an index-matching medium on the planar side. For a sphere, the point source would be located within the solid glass. However, it is common practice to truncate the sphere within the internal aplanatic radius to create a hyper-hemisphere, hemisphere, or other PCX lens so that the point source then may then be positioned on the inner aplanatic surface within the immersion medium. FIG. 2 shows the aplanatic condition implemented with immersion optics, shown as a plano-convex hemisphere coupled to the specimen by a refractive index matching medium. This is referred to herein as the aplanatic condition.

In the attachable assembly optic of the present invention, the lens and specimen are positioned to satisfy two design conditions: (1) the focus condition of the unmodified microscope; and (2) the aplanatic condition of the inserted lens.

Condition (1) is met by positioning the PCX lens such that its external aplanatic surface is tangent to the in-focus specimen plane of the unmodified microscope. In this position, the distance between the apex of the convex lens and the in-focus specimen plane of the unmodified microscope is equal to $(n_g+1)R_S$ where $n_g$ is the refractive index of immersion medium and glass lens, and where $R_S$ is the radius of curvature of the PCX lens surface.

Condition (2) is met by positioning the actual specimen in a plane tangent to the internal aplanatic surface of the PCX lens. This sets up a virtual object at the external aplanatic surface, and therefore at the in-focus specimen plane of the microscope. In this position, the distance between the apex of the convex lens and the specimen is equal to $(1+1/n_g)R_S$. If the PCX lens is a hemisphere, the immersed working distance is equal to the internal aplanatic radius, $R_S/n_g$.

For the purposes of this description $W_0$ is the working distance of the unmodified microscope objective (i.e., the distance between the objective and the in-focus object plane). Condition (1) is therefore equivalent to the relation:

$$W_0 = n_g R_S + R_S + D$$

where D is the separation distance between the apex of the hemisphere and the objective.

Figure 3:
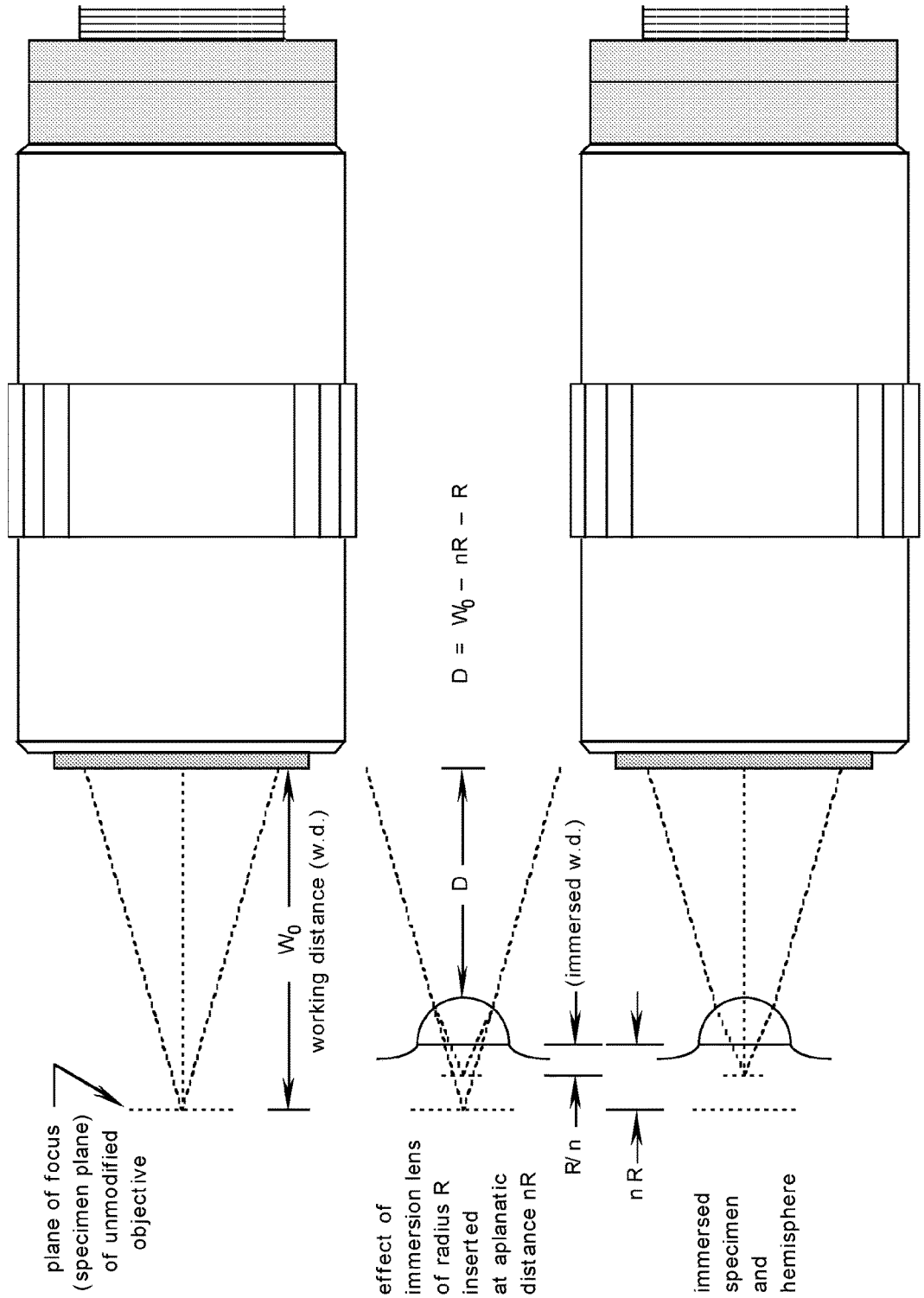
FIG. 3 is a schematic diagram showing placement of attachable accessory optic of the present invention with respect to a low-power, long working distance microscope.

FIG. 3 is a schematic diagram showing placement of attachable accessory optic of the present invention with respect to a low-power, long working distance microscope, enabling the instrument to be operated as a moderate-power microscope with sufficient immersion working distance for deep imaging and SPIM. This embodies the essential design conditions noted above.

Figure 4:
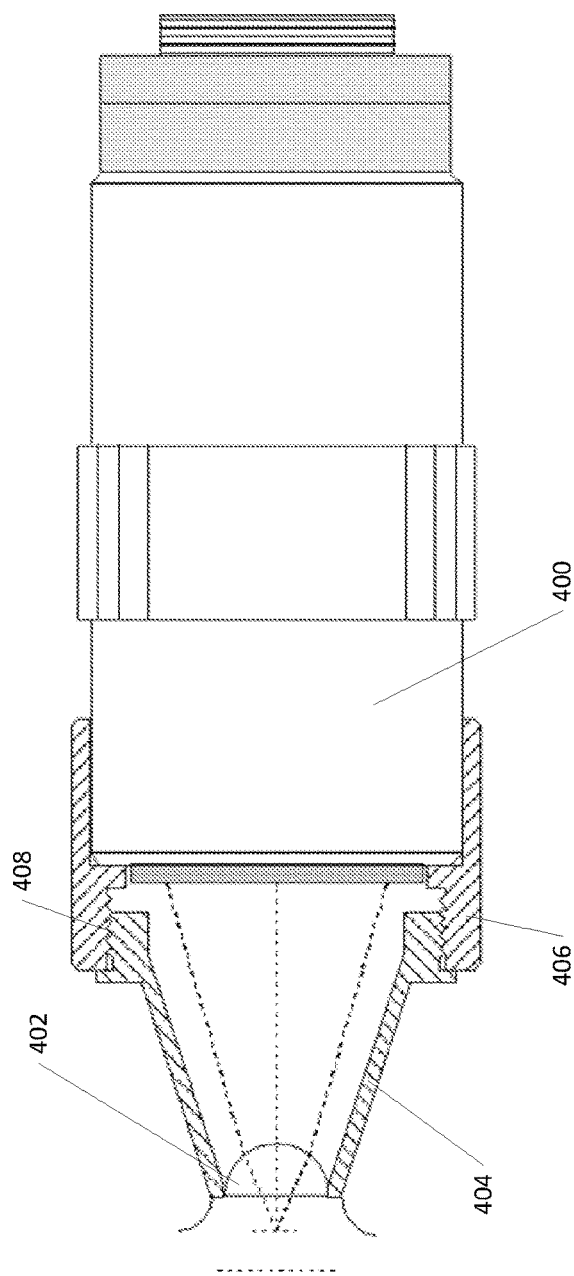
FIG. 4, View (A) shows hardware components of the one embodiment of the accessory optic of the present invention having a singlet optic element. View (B) shows an embodiment having additional optical elements.
Figure 4:
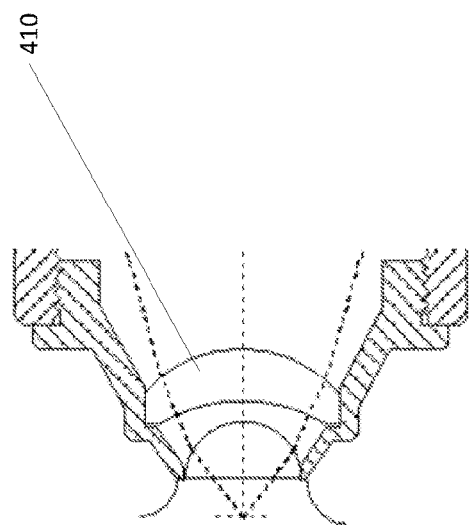

FIG. 4, View (A) shows hardware components of one embodiment of the accessory optic of the present invention comprising a singlet accessory optic for use with a microscope objective (for example, a Mitutoyo 10X 0.28NA long working distance (LWD) objective). In this embodiment, the accessory optic comprises primary optic element 402, which may be a hemisphere, a hyper-hemisphere or other PCX lens, selected such that the point source (i.e., the specimen) may be positioned on the inner aplanatic surface of optic element 402, which would lie within the immersion medium. Primary optic element 402 is disposed in removable housing 404. Attachment member 406 may be attached to microscope objective 400 such as to accept various housings 404 having various primary optic elements 402 with indices of refraction matching the index of refraction of the immersion medium. In alternate embodiments, (not shown) attachment member 406 may be attached to the microscope stand or other structures. Housing 404 may be connected to attachment member 406 via threaded arrangement or by any other known means of attachment, for example, via magnets mounted on attachment member 406 and housing 404. Nominally, the optic element 402 is fabricated from an optical glass selected to have a refractive index that matches the intended immersion medium. Attachment members 404 and 406 may also include precision alignment pins or trivets, adjustment screws, or other guides and fasteners not shown in the drawings.

Figure 5:
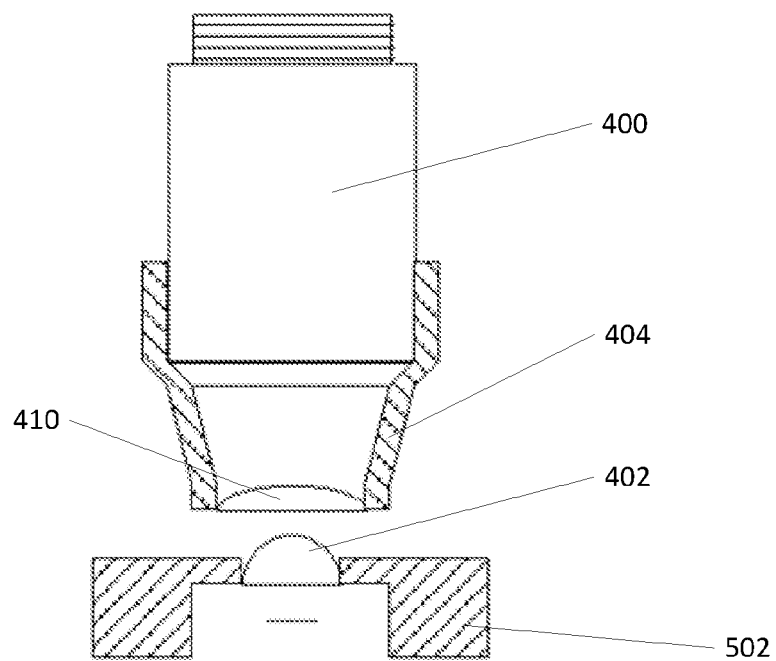
FIG. 5 shows two alternate embodiments of the Type I kit. The accessory may be mounted on the objective, or separately on the microscope stand, or both.
Figure 5:
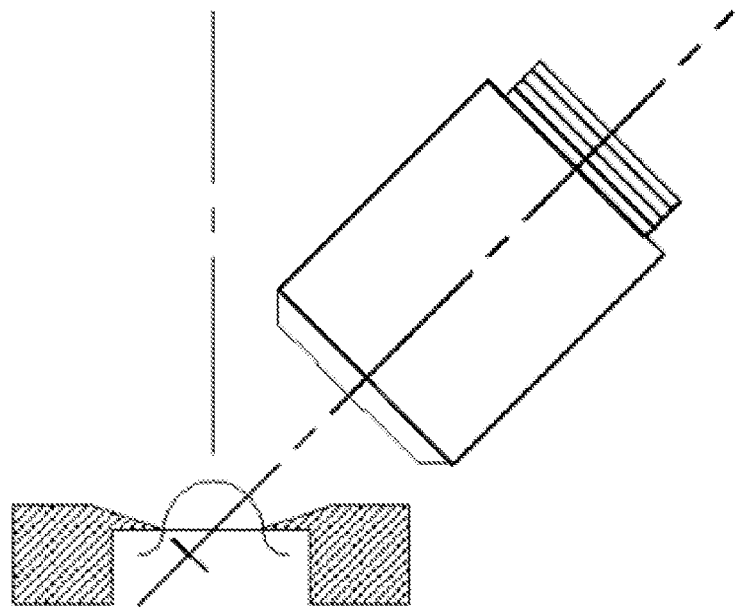

FIG. 4, View (B) shows an alternate embodiment wherein housing 404 houses both the primary optical element 402 and one or more secondary optical elements 410, for example, a meniscus lens or corrective lenses. View (A) of FIG. 5 shows an alternate embodiment of the invention wherein the primary optical element 402 is disposed in a housing 502 separate from the microscope objective. The accessory may also comprise one or more secondary optical elements 410 housed in housing 404 which is attached to the microscope objective 400. Housing 404 may be attached directly to the microscope objective 400 or may be attached via an attachment member, similar to attachment member 406 shown in FIG. 4, View (A). View (B) of FIG. 5 shows an alternate embodiment wherein the microscope objective 400 is disposed off-axis with respect to the primary optical element 402. Additional lenses such as 410 may be mounted on objective 400 as shown in the configuration of View (B) of FIG. 5.

Figure 6:
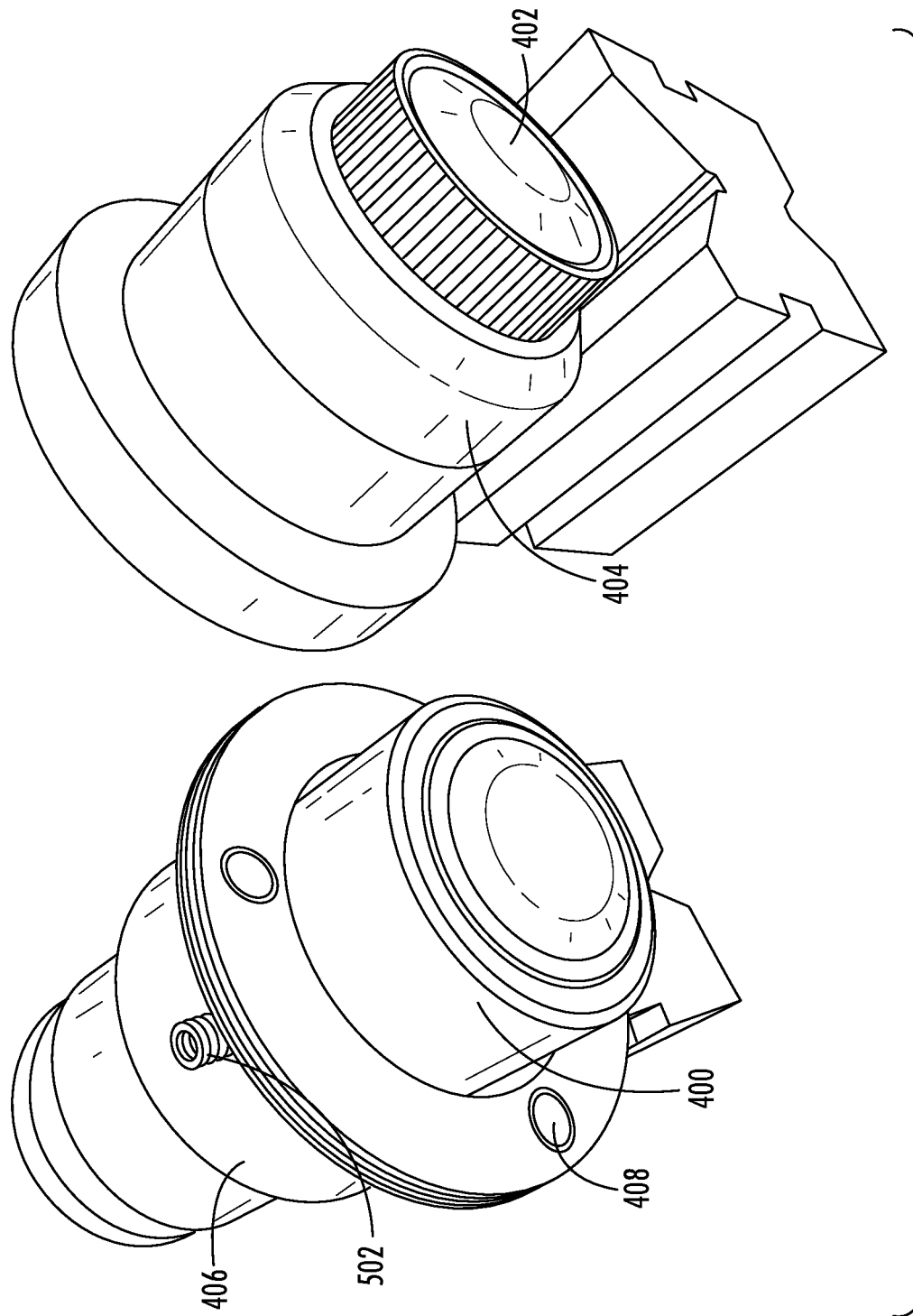
FIG. 6 shows a preferred embodiment of the accessory optic of the present invention having a magnetic mount to hold the accessory in place on a microscope objective.

FIG. 6 shows a preferred embodiment of the present invention in situ on a microscope objective. In this embodiment, attachment member 406 is attached to microscope objective 400 via a plurality of set screws 502 creating a frictional attachment between attached member 406 and microscope objective 400. Housing 404 slides on the end of microscope objective 400 and, in one embodiment, may be held in place via magnetic mounts 408 on attachment member 406, which mate with magnetic mounts on housing 404 (not shown). In other embodiments, magnetic mounts 408 may attract a steel ring configured as part of housing 404. Attachment member 406 and housing 404 may be composed of any suitable material, however, the portion of housing 404 which holds the primary optical element 402 should be composed of a material resistant to any adverse effects brought about by the intended immersion medium. Additionally, any cement or seals holding optical element 402 within housing 404 should also be resistant to any adverse effects brought about by the immersion medium.

The set screws 502 in this case, are composed of nylon to avoid damage to microscope objective 400 but may be composed of any suitable material.

Effect of the attachable front-end accessory optic on aperture and magnification. The resolution of a microscope increases with the numerical aperture (NA) of the objective. NA is defined as the refractive index of the immersion medium multiplied by the sine of the largest angle at which light rays may enter the objective, that is NA=$n_{imm}$ sin $\theta_{max}$. The maximum ray entry angle for the unmodified microscope is set by the numerical aperture of the non-immersed objective as:

$$NA=(1.000)\sin\theta_{max}=\sin\theta_{max}$$

When the hemisphere is positioned so that Conditions (1) and (2) hold, a ray can be traced exiting the hemisphere that is coincident with the marginal ray that enters the objective at the unaltered angle $\theta_{max}$. The back-trace of this ray defines the maximum ray angle in the immersed specimen, and therefore the NA of the modified system. Referring to FIG. 1, if $\theta^*$ is defined as the ray angle in the immersed object space corresponding to this marginal ray, then:

$$\frac{\sin\theta^*}{R_S}=\frac{\sin\theta''}{\frac{R_S}{n_g}}$$

therefore: sin $\theta^*$=$n_g$ sin $\theta$"

$n_g$ sin $\theta$"=(1.000)sin $\theta$' therefore: sin $\theta^*$=sin $\theta$' so: $\theta^*$=$\theta$'

$$\frac{\sin\theta_{max}}{R_S}=\frac{\sin\theta'}{n_g R_S}$$

$$n_g\sin\theta_{max}=\sin\theta'$$

therefore: $n_g$ sin $\theta_{max}$=sin $\theta$ * so: $\theta_{max}$=$\theta$"

$$NA^*=n_g \sin\theta^*=n_g(n_g \sin\theta_{max})=n_g^2 NA$$

Therefore, the immersed object and hemisphere, when used in the aplanatic condition, increases the numerical aperture by the square of the immersion index. This result is independent of $R_S$.

In the spherical system, the point object at $R_{int}$ and virtual object at $R_{ext}$ are always collinear with the center of the hemisphere. Therefore, a paraxial offset of the object from the microscope axis by a distance $h_o$ at $R_{int}$ produces a proportional offset, $h_{vo}$, of the virtual object at $R_{ext}$:

$$\frac{h_O}{R_{int}}=\frac{h_{VO}}{R_{ext}}$$

$$M^*=\left(\frac{h_{VO}}{h_O}\right)M_o=\left(\frac{R_{ext}}{R_{int}}\right)M_o=\frac{M_o n_g R_S}{\frac{R_S}{n_g}}=n_g^2 M_o$$

This shows that the immersed hemisphere also increases the magnification by the square of the immersion index.

Because both NA* and M* vary with immersion index squared, the system pupil radius is unaffected:

$$a_p^* = f_2 \frac{NA^*}{M^*} = f_2 \frac{n_g^2 NA}{n_g^2 M_0} = f_2 \frac{NA}{M_0} = a_p$$

In epi-fluorescence microscopy, increasing the magnification of the objective with a constant back pupil boosts the illumination irradiance by $$\left(\frac{M^*}{M_0}\right)^2$$

because the same total input power is concentrated into a more de-magnified field of view. Increasing the NA boosts the solid angle over which emission enters the objective by $$\left(\frac{NA^*}{NA}\right)^2.$$

In the image, the total detected fluorescence from an object therefore increases by the product of these factors:

$$\frac{F^*}{F} = \left(\frac{M^*}{M_0}\right)^2 \left(\frac{NA^*}{NA}\right)^2 = (n_g^2)^2 (n_g^2)^2 = n_g^8$$

If, for example, the hemisphere is made from BK-7 glass, having an $n_g = 1.52$:

$$\frac{F^*}{F} = (1.52)^8 = 28.5$$

The theory derived here shows that NA*, M* and $$\frac{F^*}{F}$$

do not depend on the radius of the hemisphere, therefore $R_S$ is nominally a free design parameter within limits.

Incorporation of a meniscus lens following the front element in a traditional duplex aplanatic arrangement does not change the immersed working distance, but further increases the system NA, as shown in View (B) of FIG. 4. The design parameters of the duplex (spacing, thickness, two radii, refractive index and dispersion) allow for some compensation of aberration. The disadvantage of the duplex is reduced clearance at the front end of the microscope objective.

For the duplex front end, shown in View (B) of FIG. 4, the aplanatic condition increases the achievable numerical aperture:

$$NA^* = n_1^2 n_2 NA$$

where $n_1$ is the index of the front element, and $n_2$ is the index of the meniscus. Nominally, both indices will be 1.52, therefore, in principle, $NA^* \sim (1.52)^3 NA = (3.51)$ NA.

Type II Kit

The attachable accessory optic described as the Type I Kit is also useful in the imaging method known as light-sheet microscopy or selective-plane illumination microscopy (SPIM). Here, the acronym SPIM is used to represent the imaging method. In particular, the accessory optic enables implementation of symmetric SPIM optics utilizing a pair of modified objectives for immersion in high-index solvents that are incompatible with commercially available objectives with unitized construction. Furthermore, the achievable immersed working distances allow for complete mechanical clearance of planar specimens translated through the optical-sectioning plane of the SPIM instrument. This is shown in FIGS. 7, 8, Views (A-C) of FIG. 9 and View (B) of FIG. 10 in a symmetric 45° SPIM setup.

Mechanical clearance is a major design problem in SPIM instruments, particularly symmetric setups for the high-resolution method known as "diSPIM" (dual-view SPIM). The essential design condition for the symmetric accessory kit is that the centers of the front-end hemispheres are separated by $\sqrt{2}$ times the inner aplanatic radius, so that the lenses cannot be complete hemispheres, but must be cut and abutted.

Figure 7:
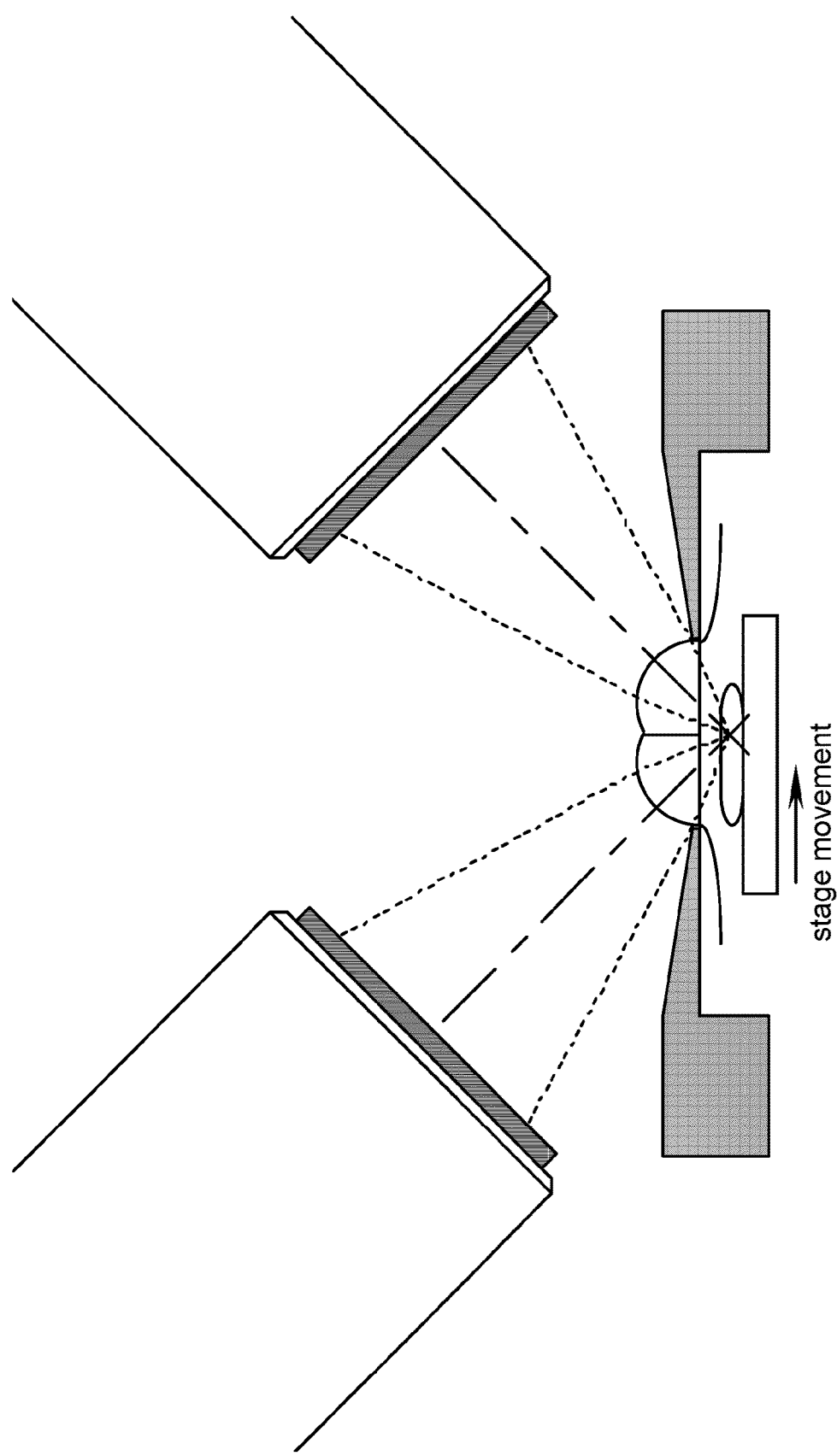
FIG. 7 shows a modified front-end lens pair in a symmetric 45° SPIM instrument with complete mechanical clearance for long-range horizontal specimen translation.

FIG. 7 shows an attachable dual-lens front end in a symmetric 45° SPIM instrument with complete mechanical clearance for long-range horizontal specimen translation. In practice, the refractive index of the immersion medium is the same as or matches closely with the refractive index of the hemispheric lenses and the specimen. As such, rays are not deviated at the lens-medium boundary. The front-end optics are shown as a specially-configured pair of plano-convex lenses which sets up the correct intersection of the optic axes of the two LWD objectives and provides clearance for the immersed specimen. This is the basic optic configuration for a Type II kit.

Figure 8:
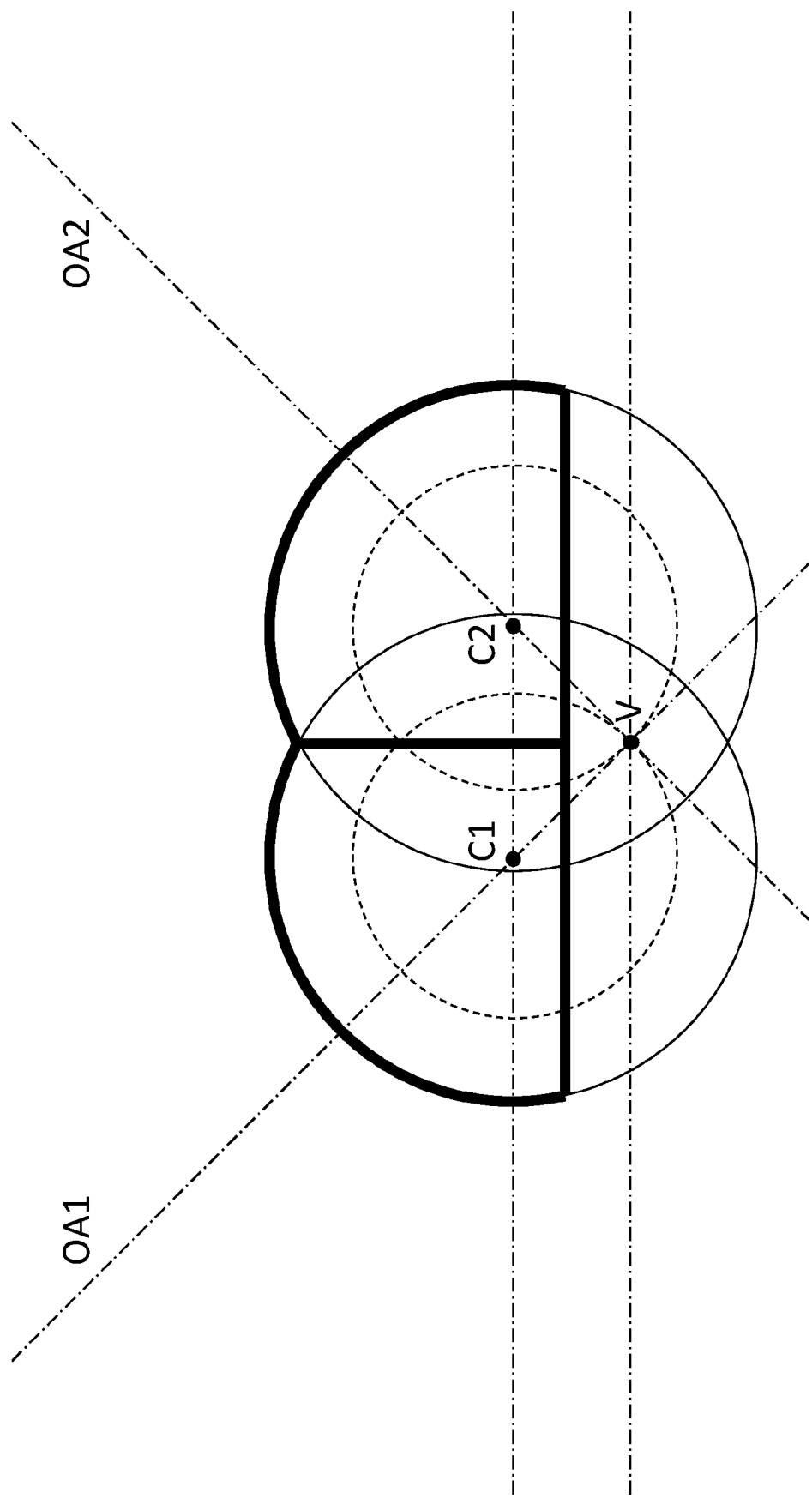
FIG. 8 presents the schematic of lens configuration for symmetric light-sheet microscopy (selective-plane illumination microscopy, SPIM).

FIG. 8 shows a schematic representation of a lens configuration for symmetric light-sheet microscopy (selective-plane illumination microscopy, SPIM). In this configuration, the inner aplanatic surfaces of both front-end lenses (shown in FIG. 8 as dashed circles) intersect the optic axis of each objective at a common point in the specimen. In the diagram, OA1 and OA2 are the optic axes of the two microscope objectives, intersecting at the vertex V. C1 and C2 mark the hemispheric centers of the front-end lenses. The triangle C1-V-C2 is a right isosceles triangle in which the leg length is equal to the inner aplanatic radius $R_S/n_g$, and the hypotenuse length is greater by $\sqrt{2}$. Therefore, the center-to-center distance of the two hemispheres is $(1.4142) R_S/n_g$. Also in this configuration, the inner aplanatic surface of each lens is tangent to the optic axis of the other lens at the point of intersection. At this point the surface tangents of the two aplanatic spheres are intersecting normal planes.

Figure 9:
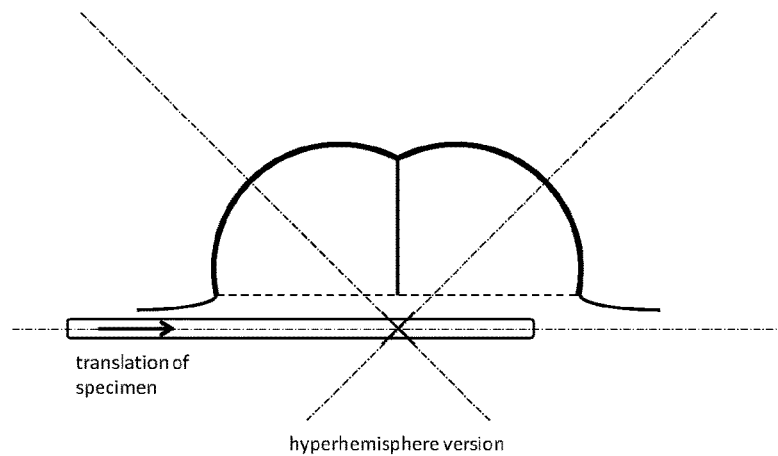
FIG. 9, View (A) shows a schematic view of Type II front-end lens pair, shown as PCX hyper-hemispheres. View (B) shows a schematic view of Type II front-end lens pair, shown as standard PCX hemispheres giving greater specimen clearance than in View (A). View (C) shows a schematic view of Type II front-end lens pair, shown as conventional PCX lenses used with a right-angle prism.
Figure 9:
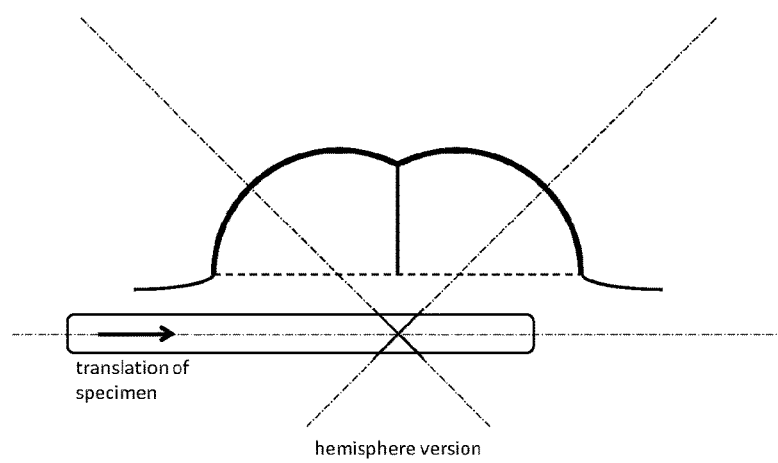
Figure 9:
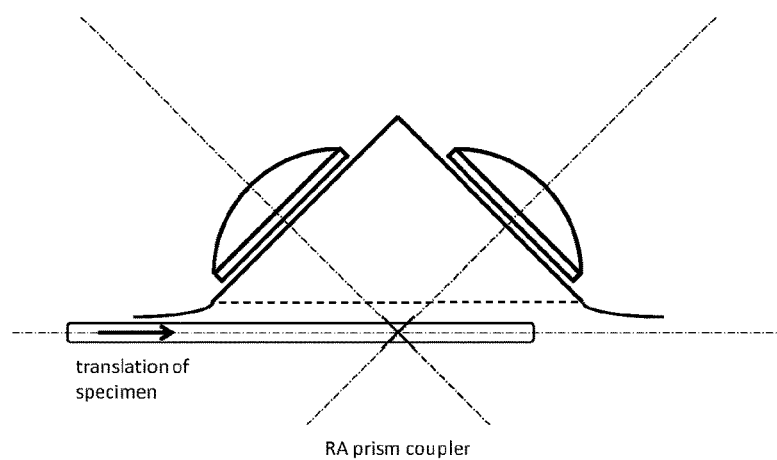

In FIG. 7, the front-end lenses are shown as hemispheres, but there is leeway in which accessible NA is traded off for working distance. This is shown in Views (A-C) of FIG. 9 as paired hyper-hemispheres, as shown in View (A) for greatest NA and smaller clearance, versus paired hemispheres, as shown in View (B), with greater clearance but reduced maximal NA. View (C) of FIG. 9 shows how attachable front-end optics may be implemented in a symmetric SPIM system using only standard optical components. In the example, two PCX lenses are immersed to a right-angle prism which is immersed to the specimen. In View (C), the refractive index of the prism is selected to match the index of the intended clarification medium for the specimen. Immersion oil or immersion medium (not shown) is also used between the PCX lenses and the prism.

Figure 10:
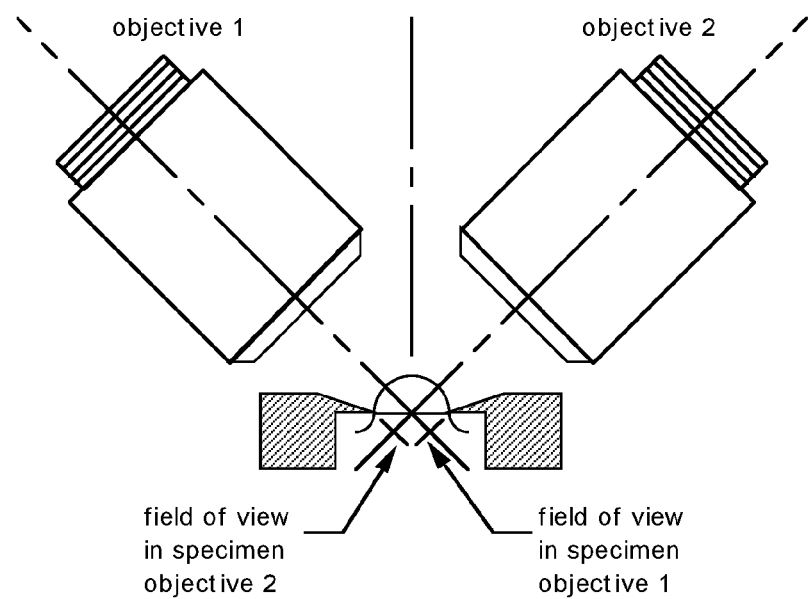
FIG. 10 shows two alternate embodiments of the type II kit.
Figure 10:
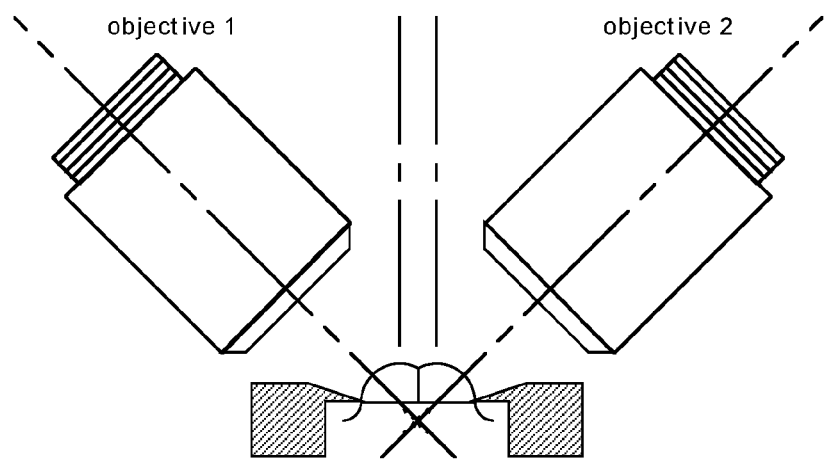

In practice, the front-end lenses may be disposed in a housing, as shown in Views (A-B) of FIG. 10 that is kept stationary such as to keep the lenses aligned with the microscope objectives. The specimen may then be moved with respect to the lenses and microscopes to allow deep imaging by light sheet microscopy. View (A) of FIG. 10 shows an alternate embodiment for conventional or confocal microscopy, not for SPIM, wherein a single plano-convex lens is used as the primary optical element, while View (B) of FIG. 10 shows a second alternate embodiment optimized for SPIM wherein dual, truncated plano-convex lenses are used as the primary optical element, as described above.

I claim:

1. An accessory optic for attachment to a microscope objective or microscope stand comprising:
   an attachment member for attachment to the microscope objective or microscope stand;
   a lens housing attached to or integral with the attachment member; and
   a plano-convex lens mounted in the housing;
   wherein the accessory optic is positioned on the microscope objective such that an external aplanatic surface of the plano-convex lens is tangent to a focus plane of the microscope objective.

2. The accessory optic of claim 1 wherein the plano-convex lens is a hemispheric or hyper-hemispheric lens.

3. The accessory optic of claim 1 wherein an intended immersed specimen is placed at an inner aplanatic surface of the plano-convex lens.

4. The accessory optic of claim 3 wherein the accessory optic is positioned on the microscope objective such that the axis of the microscope objective passes through a center of curvature of the plano-convex lens and is perpendicular with a plano surface of the plano-convex lens.

5. The accessory optic of claim 4 wherein the plano-convex lens is selected such that the refractive index of the plano-convex lens approximates the refractive index of an immersion medium in which the accessory optic is intended to be immersed.

6. The accessory optic of claim 3 wherein the accessory optic is positioned on the microscope objective such that the axis of the microscope objective passes through a center of curvature of the plano-convex lens and is not perpendicular with a plano surface of the plano-convex lens.

7. The accessory optic of claim 3 wherein the accessory optic increases the numerical aperture of the microscope objective.

8. The accessory optic of claim 1 further comprising one or more secondary lenses positioned between the microscope objective and the plano-convex lens.

9. The accessory optic of claim 1 wherein the microscope objective is a non-immersion objective and further wherein the accessory optic converts the microscope objective to an immersion objective.

10. An accessory optic set for attachment to two microscope objectives arranged in a symmetric 45° configuration comprising:
    a lens housing configured to be placed between the two microscope objectives and a specimen; and
    an optic element mounted in the housing comprising dual plano-convex lenses arranged such that the centers of the plano-convex lenses are separated by $\sqrt{2}$ times the radius of an inner aplanatic surface of the lenses;
    wherein the two microscope objectives are arranged such as to have orthogonal co-planar axes configured to intersect at a point where the inner aplanatic surfaces of the dual plano-convex lenses intersect.

11. The accessory optic of claim 10 wherein the dual plano-convex lenses are truncated hemispheric or hyper-hemispheric lenses.

12. The accessory optic of claim 10 wherein the dual plano-convex lenses comprise two plano-convex lenses coupled to adjacent sides of a right-angle prism.

13. The accessory optic of claim 12 wherein the dual plano-convex lenses are coupled to adjacent sides of the right-angle prism via an immersion medium.

* * * * *